June 4, 1940.   N. E. WAHLBERG   2,203,477
VENTILATING SYSTEM FOR AUTOMOBILES
Filed Feb. 10, 1938   2 Sheets-Sheet 1
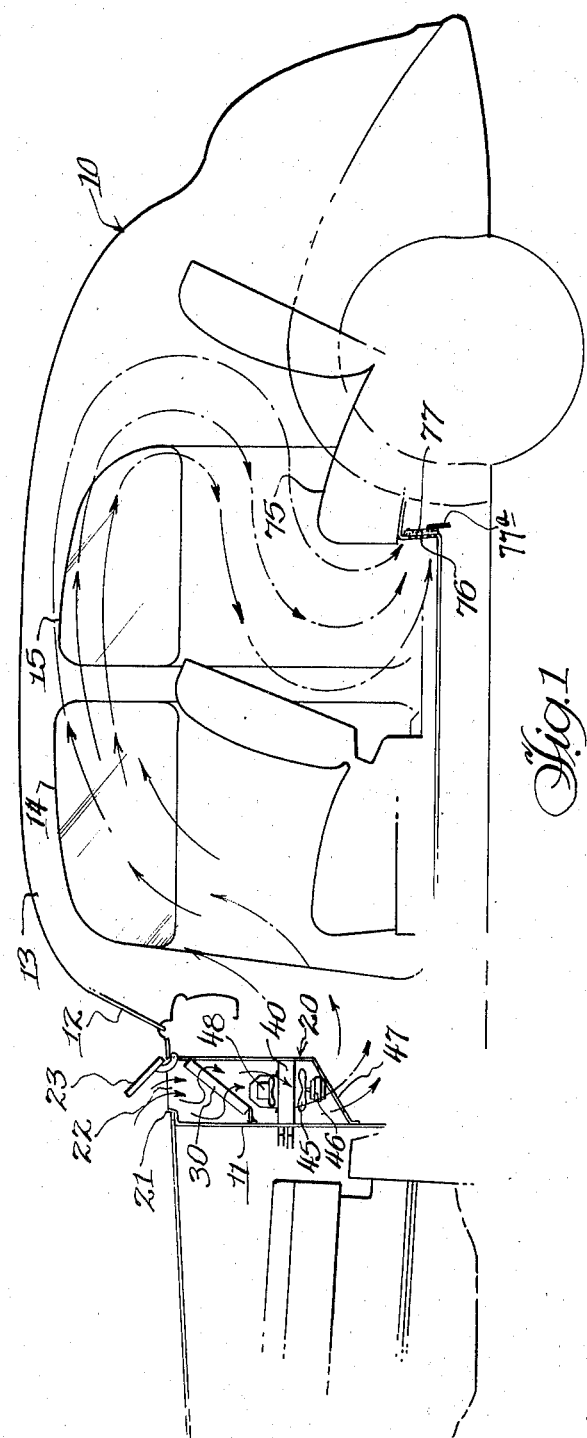
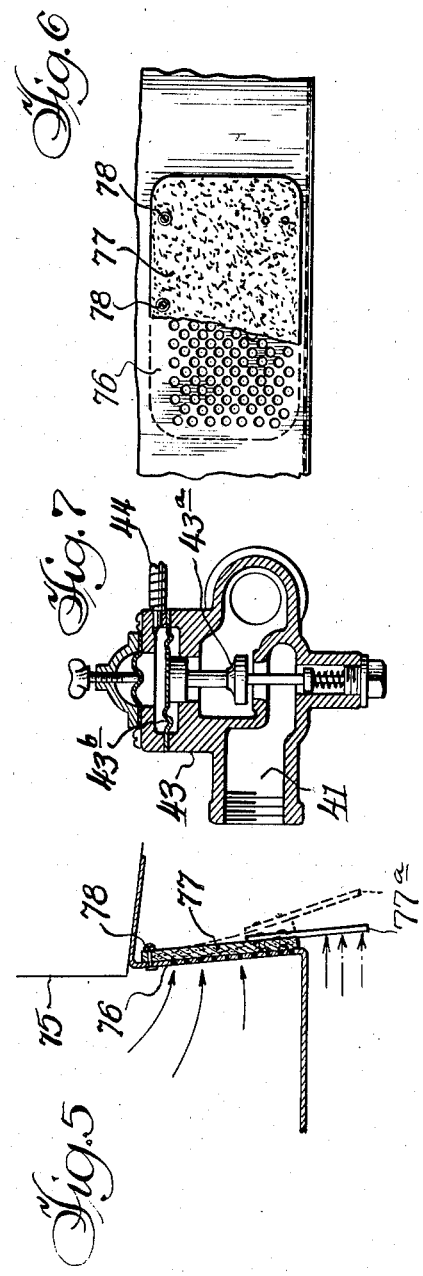
Inventor
Nils E. Wahlberg,

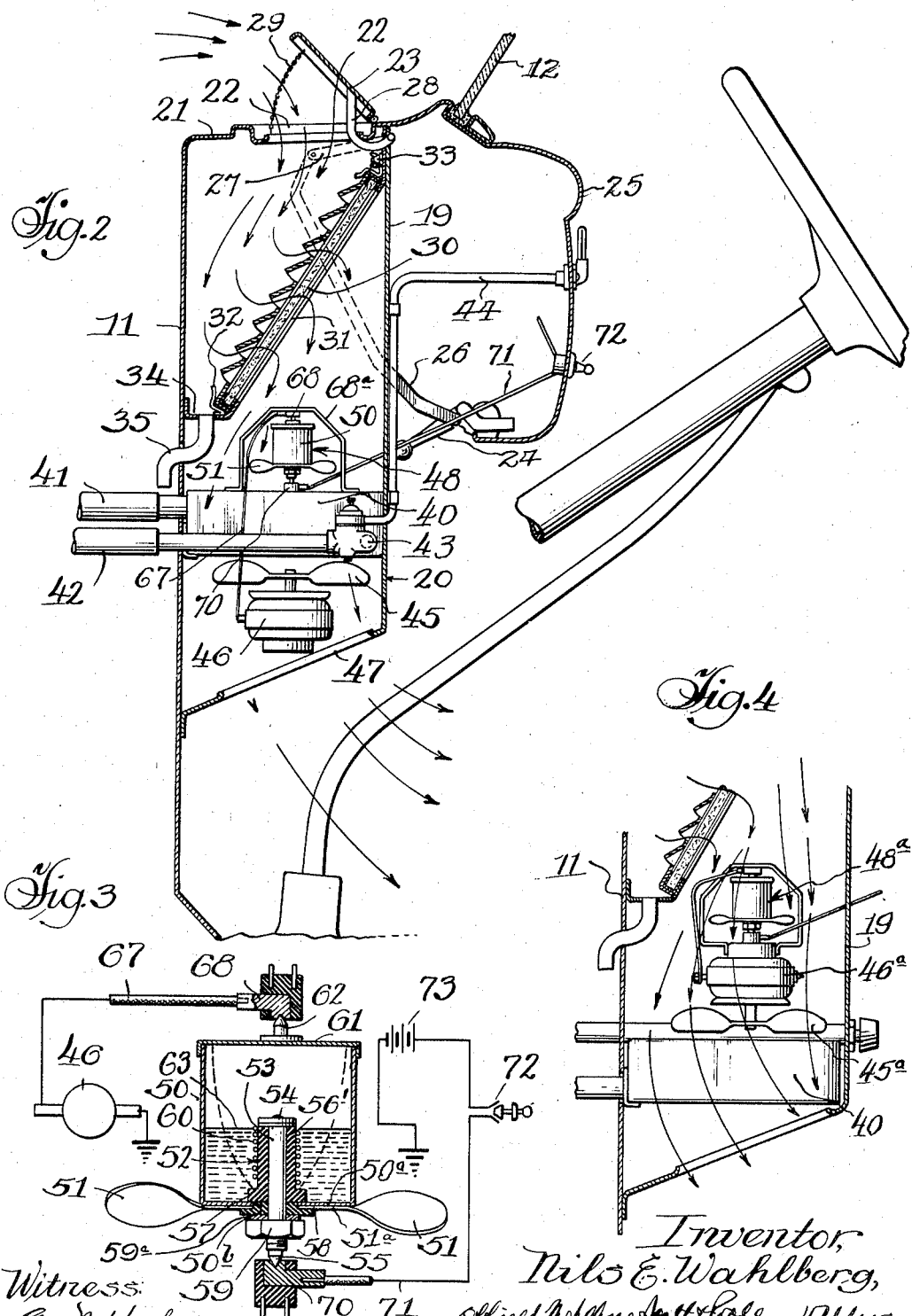

Patented June 4, 1940

2,203,477

UNITED STATES PATENT OFFICE 2,203,477

VENTILATING SYSTEM FOR AUTOMOBILES

Nils Erik Wahlberg, Kenosha, Wis., assignor to Nash-Kelvinator Corporation, Kenosha, Wis., a corporation of Maryland Application February 10, 1938, Serial No. 189,755

3 Claims. (Cl. 98—2)

This invention relates to improvements in heating and ventilating systems for vehicles and particularly for automobiles, and has for its principal object to provide means for insuring a constant supply of fresh air from the exterior of the car body, together with means for preheating such air and maintaining substantially even moderate temperature within the car body with varying car speeds and exterior temperatures.

With previous automobile heating systems, and particularly the conventional arrangement employing a hot water heater with an auxiliary fan mounted in the car body for reheating and recirculating the air within said body, it has been very difficult to maintain a comfortable interior temperature without cold drafts, and to overcome fogging or frosting of the windows caused by condensation of moisture thereon in cold weather. It has been found that this condensation is largely due to the fact that the air confined in the enclosed passenger compartment becomes highly saturated with moisture resulting from the respiration of the occupants. The moisture-laden, vitiated air then chills and the moisture condenses on the cold window surface. This unhealthy condition has become particularly objectionable with recent so-called streamline body designs tending toward smaller air capacity of the passenger compartment. Moreover, with such streamline designs the motion of the car tends to produce a condition of partial vacuum within the passenger compartment, and exterior air is drawn in by leakage at various points around window and door frames so as to cause uncomfortable cold drafts of uncertain origin.

In more recent developments of automobile ventilating systems, these objectionable features have been partially overcome, and much more healthy conditions brought about, by forcing a constant supply of fresh exterior air, preheated before discharge, into the car body, so as to continuously replace the vitiated, moisture-laden air in the body. Since exterior air is usually of relatively low humidity during colder winter months, such fresh preheated air can usually be relied upon to reduce the average relative humidity of the air in the car body to a point where condensation on the windows can be eliminated even at extremely low exterior temperatures.

Among the problems encountered in the successful adaptation of such a ventilating system employing preheated fresh exterior air introduced under pressure as described, are those of providing sufficient heating and temperature control facilities for the incoming air, and insuring a sufficiently large and continuous fresh air supply. For best results, it has been found that incoming air should be introduced in considerably greater volume than that usually recirculated through the heater in previous heating systems. Thus it is desirable to provide a forced draft system that will not cause an excessive drain on the available power supply of the automobile, particularly where an electric fan is used for this purpose.

In carrying out the present invention, I provide an improved ventilating system which includes improved means for utilizing to a large extent the speed of the car for introducing a relatively large volume of fresh preheated exterior air into the car body. In order to maintain a substantially continuous supply of fresh exterior air, and particularly when the car is moving slowly or is at rest, I also provide a fan or blower which is automatically controlled and operated by means responsive to the velocity of incoming air produced by movement of the car, so that when the supply of exterior air drops below a predetermined value, the fan automatically becomes operative to continue the air supply.

I find further that a fresh air ventilating system of the character hereinabove described operates most efficiently when all the car windows are closed, so as to produce and maintain a slight air pressure within the car body instead of a slight vacuum as is usually the case. There is usually sufficient leakage around the windows and doors of modern cars to permit some escape of the vitiated or exhausted air as the fresh air supply is introduced to replace it. Nevertheless the amount of such leakage varies considerably with different car bodies, and from time to time with the same car body. For best results, therefore, I provide means co-operating with the forced air supply for automatically maintaining a substantially constant, predetermined pressure within the car body. This feature insures the positive discharge of vitiated air from the car, and eliminates objectionable drafts of cold air from the exterior at various points where leakage may occur. It also facilitates control of the temperature and insures substantially uniform distribution of heat within the car under all conditions.

Other objects and advantages of my improved heating and ventilating system will appear from time to time as the following description proceeds.

The invention may best be understood by reference to the accompanying drawings, in which Fig. 1 is a fragmentary side view of an automobile to which my improved ventilating device is applied, with parts broken away to show details of the latter.

Fig. 2 is an enlarged detail section of one form of ventilating unit utilized in connection with my invention.

Fig. 3 is an enlarged detail view of the anemometer switch mechanism employed in the unit shown in Figs. 1 and 2.

Fig. 4 is a detail section of a modified form of ventilating unit.

Fig. 5 is an enlarged detail section of the air valve employed to maintain a predetermined air pressure within the car body.

Fig. 6 is a fragmentary face view of the air valve shown in Fig. 5, with the counterweight removed.

Fig. 7 is an enlarged sectional view of the thermostatic control valve for the heater.

Referring now to details of the apparatus illustrated in the drawings, an enclosed automobile body of conventional form is indicated generally at 10 and includes a dashboard 11, windshield 12, top 13 and front and rear doors 14 and 15. In the embodiment of my invention disclosed, a ventilating unit indicated generally at 20 is mounted on the rear of the dashboard 11 and immediately below the cowl 21 so as to utilize the conventional cowl vent 22 as the fresh air inlet. As usual, said cowl vent is provided with a cover 23 preferably hinged adjacent its rear edge so as to be swung upwardly and form in effect a forwardly-opening scoop for directing the air into the ventilating unit 20 when the vehicle is in motion. The vent cover 23 may be opened as usual by hand lever 24 mounted on the bottom of the instrument panel 25, and operatively connected to the vent cover 23 by links 26, 27 and hinge 28. A screen element 29 may also be mounted as usual in depending relation from the under surface of the vent cover 23 adjacent its forward edge, to keep foreign bodies out of the vent opening when the cover is raised.

Near the top of the ventilator casing 20 and just below the vent opening 22 is mounted a suitable filter element 30 to remove dust and dirt from the air, and protect the car from egress of rain and snow. The specific form of filtering device shown herein is the subject-matter of a co-pending application for Letters Patent of Meade F. Moore, filed February 4, 1938, and bearing Serial No. 188,712. Said filtering device includes a filter element 30 which is supported in forwardly inclined position on an open frame 31 having its upper rear end secured along the upright wall 19 of the ventilator casing, and its lower forward end secured along the dashboard 11. The filter element 30 is removably secured in U-shaped clips 32 fixed at the bottom of the frame, and detachable clips held by wing nuts 33 at the top of said frame. The lower part of said frame is closed along the bottom of the filter element so as to form a drain trough 34 for receiving water from said filter element. A drain pipe or tube 35 leads from said trough to the exterior of the ventilator casing, as for instance through the dashboard 11 into the engine compartment.

A heating element 40, herein consisting of a hot water radiator core of the usual form, is mounted in the ventilator casing 20 below the filter and completely across the main air passage through said casing. Said radiator core is connected as usual to the engine cooling system of the automobile by pipes 41 and 42. One of the pipes 42 may be thermostatically controlled by valve 43 of any suitable form so as to vary the amount of heat available in the radiator core under varying temperature conditions in the car body. The thermostatic valve may be of any suitable form such as the familiar type shown in detail in Fig. 7, including a valve member 43ª connected with a diaphragm 43ᵇ operated by variable pressure of expansive fluid in tube 44. The latter tube communicates with the diaphragm 43ᵇ and may be extended to any suitable point in the car body so as to be responsive to temperature therein. As shown herein, said tube extends to the instrument panel 25.

A fan 45 and electric motor 46 of suitable form are mounted in the lower part of casing 20, preferably just below the radiator core 40 and above the air discharge opening 47 at the bottom of said casing. Said fan motor may be connected as usual to the car battery. In circuit with the fan is an anemometer switch 48 located above the radiator core 40 in the path of the incoming air current. Said anemometer switch includes a rotating member carrying a body of mercury or lead shot which operates by centrifugal action to control the operation of the fan motor automatically, depending upon the speed of rotation of the anemometer, as may best be understood from Fig. 3.

The anemometer switch includes a cylindrical metal cup or casing 50 provided with air vanes 51 on disc 51ª mounted rigidly therewith so as to extend from its sides. A cylindrical projection 52 extends upwardly into said casing from the bottom wall 50ª. Said projection includes an insulating sleeve 56 having a flange 57 at its lower end and a metallic center post 53 having a cap 54 at its upper end and projecting downwardly through the insulating sleeve 56 and the aperture 50ᵇ in the bottom wall 50ª of the casing. The lower end of the post 53 is pointed as indicated at 55 to form a lower pivotal bearing for the rotating parts of the switch device. A nut 59 is threaded on the lower end of the post 53 and engages a washer 59ª which in turn engages an insulating disc or washer 58 which closes the aperture 50ᵇ and insulates said casing from the center post 53. A resistance wire 60 is coiled on the insulating sleeve 56 within the casing 50 with its upper end connected to the post 53 as by engagement with the cap 54 thereof. The lower end of said resistance wire terminates a short distance above the flange 57 of said insulating sleeve so that the only electrical connection of said wire with the post 53 is through the upper terminal of said wire. A metallic cover 61 encloses the top of casing 60 and has a pointed stud 62 forming the upper pivotal bearing for the rotating parts of the switch device.

A quantity of mercury or lead shot 63 is enclosed in the casing 50 so that when said casing is at rest substantially all of the resistance coil 60 on the center projection 52 is submerged, as indicated in full lines in Fig. 3. The arrangement is such that when the action of moving air on vanes 51, 51 rotates the casing on its pivotal bearings 55 and 62, the surface of the mercury tends to become concave due to centrifugal action, and a part of the mercury will spread upwardly along the sides of the casing so as to expose the coils of resistance wire 60 progressively as the speed of rotation of the casing increases.

Finally at a predetermined speed the surface of the mercury will assume a shape indicated by dotted lines in Fig. 3 in which the mercury no longer contacts with the resistance wire 60, and no more current can flow through the switch.

The remaining parts of the electrical circuit through the anemometer switch and fan motor 46 is indicated diagrammatically in Fig. 3 and includes conductor 67 leading from the insulated top bearing seat 68 through fan motor 46 to ground, and a conductor 71 leading from the insulated bottom bearing seat 70 through manual switch 72 on the instrument panel, and through battery 73 to ground.

In the arrangement of parts shown in the drawings, the lower bearing seat 70 of the anemometer switch is mounted on the upper surface of the radiator core 40 and the upper bearing seat 68 of said switch is supported in an inverted U-shaped frame 68a having its legs also mounted on the radiator core 40.

The principal function of the anemometer switch device above described is to cut out the current through the fan motor at all times that a sufficient supply of air is being forced through the ventilator casing due to the speed of the car, but to close the fan circuit automatically whenever the car speed is insufficient to maintain the desired volume of incoming air. Under most driving conditions with ordinary car speeds, I find that by keeping the inlet vent cover 23 wide open an ample supply of fresh air will be forced through the ventilator casing and discharged into the car without calling upon the fan 46. However, within the range of relatively low car speeds wherein the fan is put into use, the anemometer switch automatically controls the current through the fan motor so that the effective power of the fan is automatically varied in inverse relation to the volume of incoming air at any given instant. Thus the air supply is augmented by the fan only when, and to the extent, it is necessary to maintain a predetermined minimum volume of incoming air for ventilating purposes, and the resulting drain on the battery is accordingly reduced to a minimum.

It will be understood further, however, that the volume of air that will be introduced through the ventilating unit is partially dependent upon the means provided for escape of air from the vehicle body. For winter driving and for summer driving in dusty or rainy weather, my ventilating system is especially designed to operate with all of the car windows and doors closed, so that all of the incoming air will be filtered, and in winter heated before discharge into the passenger compartment. Leakage of air around the car doors and windows permits some vitiated air to escape as it is replaced by fresh air entering the ventilator unit, but the amount of such leakage varies greatly with different body structures, and in many instances is insufficient to insure the desired inflow of air due to excessive back pressure produced within the car body. Moreover, the escape or leakage of air may be at different points in various cars, so that the air currents produced in the car by the incoming and exhausting air are not uniformly distributed. In the embodiment of my invention illustrated, I provide means for insuring a more uniform inflow and distribution of air currents in the car, consisting of an air exhaust valve or damper located at a suitable point in the car body, as for instance beneath the rear seat 75. Said exhaust valve comprises perforated frame 76 having a closure member 77 on its outer face normally urged under yielding pressure against the frame 76, but permitting escape of air from the interior of the vehicle when the interior pressure exceeds a predetermined value as compared with the exterior air. In the form shown herein, the closure member 77 consists of a slab of sponge rubber suitably fastened as by bolts 78, 78 along its upper edge and disposed at a rearwardly and downwardly inclined angle so as to be maintained in engagement against the frame 76 by gravity. A blade 77a is connected to the closure member 77 and depends below the adjacent parts of the car floor so as to project into the air stream produced by movement of the car. This will assist in opening the exhaust valve substantially in proportion to the amount of air that is being introduced into the car at the ventilator opening. This exhaust valve therefore forms a part of the ventilating system to keep dust and dirt from entering the vehicle, but opens outwardly under a predetermined excess of pressure within the car produced by operation of the ventilating unit, to insure a continuous movement of air in a more or less well defined path leading from the ventilating unit rearwardly through the car body and out of the exhaust valve as indicated in Fig. 1. The back pressure in the car body caused by the operation of the ventilating unit can thus be limited and controlled, regardless of the amount of air leakage present at other points of the vehicle body. Moreover, the temperature of the air within the body during cold weather is directly affected by the velocity and volume of air passing through the heater 40. Accordingly, the provision of the exhaust valve 76 insures far more uniform heating and ventilating conditions in different automobile bodies than has heretofore been considered possible.

Fig. 4 shows a modified form of ventilating device wherein the fan 45a and fan motor 46a are located above the radiator core 40a, but still in spaced relation below the anemometer switch mechanism indicated at 48a. In other respects, the construction and arrangement of the ventilator unit is the same as previously described in connection with the form shown in Fig. 2.

The use and operation of the ventilating system above described can now be explained generally as folows: The ventilating unit is capable of providing the entire fresh air supply to the vehicle when the windows and doors are fully closed, as for instance under moderate weather conditions to keep out dust, dirt and rain, or under cold weather driving conditions, when the incoming air may also be heated to maintain the interior air at a comfortable temperature. With a forwardly opening air inlet such as cowl vent 22 with its cover plate 23, a sufficient supply of fresh exterior air can be forced into the vehicle through the ventilating unit at moderate and high car speeds without the use of forced draft means such as an electric fan. However, at lower car speeds and when the car is standing still, the fan is automatically put into operation by the anemometer control switch 48 so as to maintain a minimum fresh air supply required for ventilating and heating purposes. In practice, I find that with proper design of air intake, filter and exhaust valve, a sufficient fresh air supply can be maintained without use of the fan, at car speeds around 20 or 25 miles per hour or over. In such instances the anemometer switch mechanism is preferably adjusted so as to start the fan in operation whenever the inflowing air velocity resulting from the car speed falls below a predetermined rate, corresponding to the normal inflow when the cowl vent is fully open and the car is moving at the rate of, say, 20 to 25 miles per hour. Within this range of relatively low inflow velocities the anemometer switch will, as previously described, vary the resistance in the fan motor circuit in inverse relation to the rate of inflow so as to maintain a predetermined minimum inflow of air, even when the car is at a standstill.

It will be understood that with an exterior air inlet such as employed with my ventilating system, the ideal condition would be one in which the air inflow is automatically maintained at a uniform rate regardless of car speed. This would be particularly advantageous where, as shown herein, the heat available in the radiator 40 is thermostatically controlled. However, this ideal condition cannot be fully attained without the use of far more complicated mechanism or apparatus than would be economical for ordinary use. It will be seen, however, that my ventilating system is capable of approximating this ideal condition, with a minimum amount of attention from the operator. Thus, at low and medium car speeds, there is little if any appreciable difference between the amount of air supplied by the fan and the amount supplied at slightly higher car speeds when the operation of the fan is automatically discontinued. At still higher speeds, any excessive air supply can be easily controlled by partially closing the cowl vent cover 23 as required. In practice, however, such manual control of the air supply will seldom be found necessary, unless it be in cases of sustained high car speeds, or in very low exterior temperatures. But even when the air inlet or cowl vent is thus restricted, it will be understood that the fan and its automatic control mechanism will still tend to maintain the same minimum air supply as it does when the cowl vent is fully open. Since the anemometer switch is responsive to the velocity of air passing through the ventilator unit, partial restriction of the cowl vent may cause the fan to start operation at a somewhat higher car speed, but the fan will tend to deliver substantially the same volume of air to the car body, while it is in operation, unless the vent is almost or fully closed.

Although I have shown and described certain embodiments of my invention, it will be understood that I do not wish to be limited to the exact construction shown and described, but that various changes and modifications may be made without departing from the spirit and scope of my invention as defined in the appended claims.

I claim as my invention:

1. In a ventilating system for car bodies, a casing having an air inlet facing forwardly of the car to entrain exterior air while the car is in motion, said casing also having a discharge opening communicating with the interior of the car, an air filter in said casing beyond said air inlet opening, a heat interchanger and an electrically driven air fan in said casing beyond said filter, circuit connections for said air fan, and switch means in said fan motor circuit connections including a rotating element of the anemometer type disposed in the casing and automatically responsive to variations in air velocity produced by said entrained air and said fan to vary the resistance in said fan motor circuit in inverse relation to the air velocity passing through said casing at relatively low rates, and to cut off said fan motor circuit entirely during such times that the air velocity exceeds a predetermined rate.

2. In a ventilating system for car bodies, a casing having a variable-opening air inlet facing forwardly of the car to entrain exterior air while the car is in motion and a discharge opening communicating with the car body, an air filter in said casing below the air inlet, manual control means for varying the effective size of said air inlet opening, a heat interchanger and an electrically driven air fan in said casing below said filter, circuit connections for said air fan, and switch means in said fan motor circuit connections including a rotating element of the anemometer type disposed in the casing and automatically responsive to variations in air velocity produced by said entrained air and said fan to cut off the fan when the velocity exceeds a predetermined rate.

3. In a ventilating system for car bodies, a casing having a variable-opening air inlet facing forwardly of the car to entrain exterior air while the car is in motion, and a discharge opening communicating with the car body, an air filter in said casing below the opening, manual control means for varying the size of said inlet opening, a heat interchanger and an electrically driven air fan in said casing below said filter, circuit connections for said air fan, and switch means in said fan motor circuit connections including a rotating element of the anemometer type disposed in the casing and automatically responsive to variations in air velocity passing through the latter to cut off the fan when the velocity exceeds a predetermined rate and to vary the resistance in said fan motor circuit in inverse relation to air velocities below said predetermined rate.

NILS ERIK WAHLBERG.